United States Patent [19]

Hemmie et al.

[11] Patent Number: 5,394,559
[45] Date of Patent: Feb. 28, 1995

[54] MMDS/ITFS BI-DIRECTIONAL OVER-THE-AIR TRANSMISSION SYSTEM AND METHOD THEREFOR

[75] Inventors: Dale L. Hemmie, Burlington, Iowa; Charles L. Brown, Knoxville, Ill.

[73] Assignee: Conifer Corporation, Burlington, Iowa

[21] Appl. No.: 77,292

[22] Filed: Jun. 15, 1993

Related U.S. Application Data

[63] Continuation-in-part of Ser. No. 48,985, Apr. 16, 1993.

[51] Int. Cl.[6] .............................................. H04H 1/00
[52] U.S. Cl. ..................................... 455/5.1; 455/6.2; 348/13
[58] Field of Search ....................... 348/10, 11, 12, 13; 358/86; H04N 7/10; 455/3.2, 6.2, 5.1, 6.1; 343/840

[56] References Cited

U.S. PATENT DOCUMENTS

| | | | |
|---|---|---|---|
| 3,162,858 | 12/1964 | Cutler | 343/753 |
| 4,290,068 | 9/1981 | Bogner | 343/702 |
| 4,295,143 | 10/1981 | Winegard et al. | 343/840 |
| 4,513,293 | 4/1985 | Stephens | 343/840 |
| 4,554,552 | 11/1985 | Alford | 343/840 |
| 4,595,890 | 6/1986 | Cloutier | 333/21 A |
| 4,791,717 | 12/1988 | Hemmie | 29/600 |
| 4,811,031 | 3/1989 | Maile et al. | 343/840 |
| 4,896,163 | 1/1990 | Shibata et al. | 343/786 |
| 5,008,956 | 4/1991 | Hemmie | 455/318 |
| 5,019,833 | 5/1991 | Nonaka | 343/840 |
| 5,020,149 | 5/1991 | Hemmie | 455/325 |
| 5,027,430 | 6/1991 | Yamauchi et al. | 455/188.1 |
| 5,060,262 | 10/1991 | Bevins, Jr. | 380/19 |
| 5,079,628 | 1/1992 | Tomikawa | 358/86 |
| 5,122,878 | 6/1992 | Heigl et al. | 455/180.1 |
| 5,191,350 | 3/1993 | Hemmie | 343/840 |
| 5,202,699 | 4/1993 | Hemmie et al. | 343/840 |
| 5,257,099 | 10/1993 | Morales-Garza | 455/5.1 |

FOREIGN PATENT DOCUMENTS

| | | | |
|---|---|---|---|
| 1149931 | 7/1983 | Canada | 343/840 |
| 0076642 | 6/1981 | Japan . | |
| 0003439 | 1/1982 | Japan | 455/339 |
| 0238130 | 10/1986 | Japan . | |

OTHER PUBLICATIONS

Federal Communications Commission General Docket No. 90–60.
Conifer Product Bulletin, Model QL–3010, QL–3012, Oct. 1992.
Jerrold, UHF Stacked Bowties and UHF Yagi Antennas.
Channel Master, Stop By, Booth Number 24.
Block Down Converters by Pacific Monolithics.
Lance Industries, Microwave 3 Ft., 4 Ft. or 6 Ft. Dish Parabolics.
CableVision, Tanner Electronic Systems Technology, Inc.
Lance Industries, Microwave Section Parabolics.
Conifer, MDS Receiving Equipment.
Channel Master, Channel Master Wireless Cable Equipment.

*Primary Examiner*—James J. Groody
*Assistant Examiner*—Sherrie Hsia
*Attorney, Agent, or Firm*—Dorr, Carson, Sloan & Peterson

[57] ABSTRACT

A bi-directional MMDS/ITFS response converter and feed system connected to an antenna for receiving MMDS programming from a central location and for receiving information/data signals from a set top for retransmission of these signals back to the central location, The bi-directional converter has a down converter connected to a first feed for down converting conventional programming signals from the first feed into a group of converted programming signals and an up converter for up converting data/information signals from the communication line into ITFS response signals and delivering them into a second feed for transmission, The bi-directional MMDS/ITFS response converter of the present invention uses a common local oscillator for driving both the down converter and the up converter and a dual feed printed circuit board having the first feed dipole printed orthogonally to the second feed dipole,

21 Claims, 8 Drawing Sheets

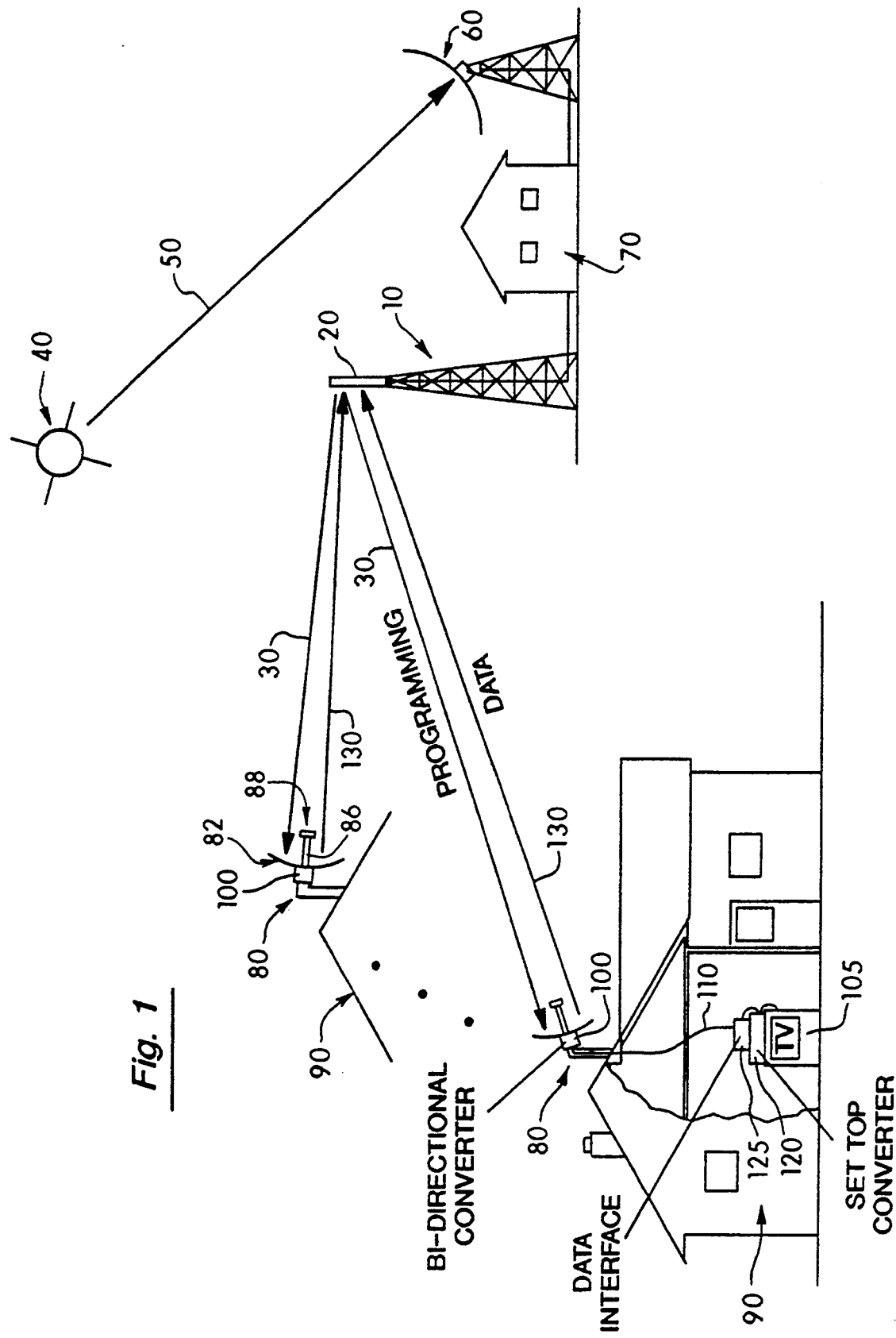

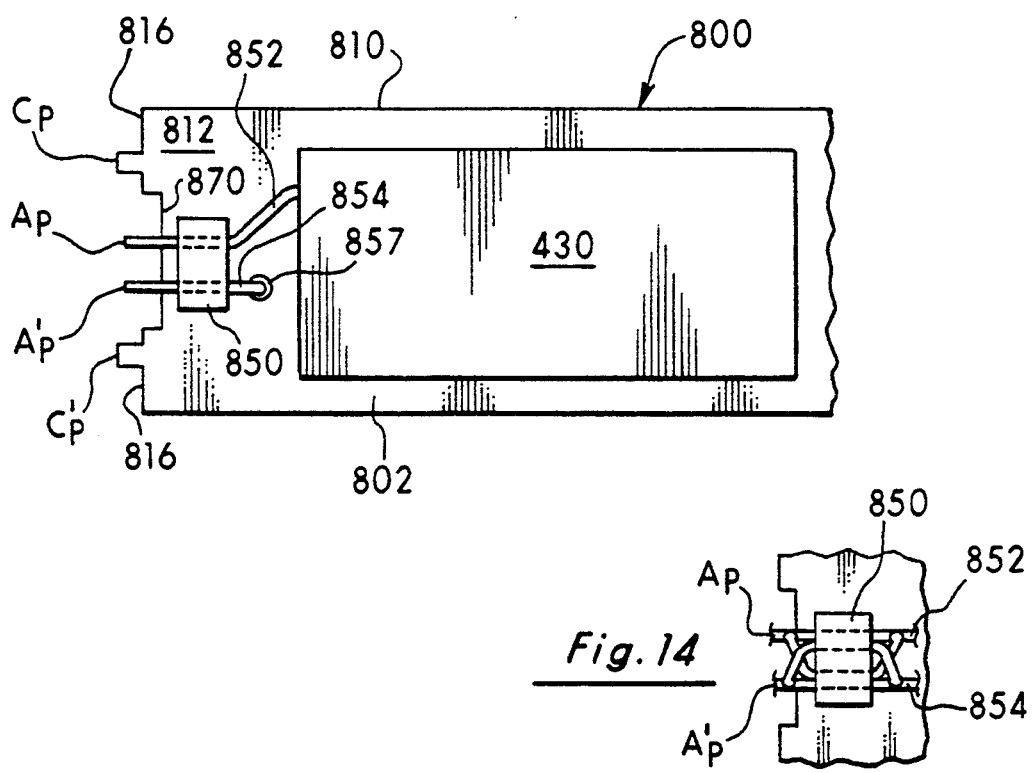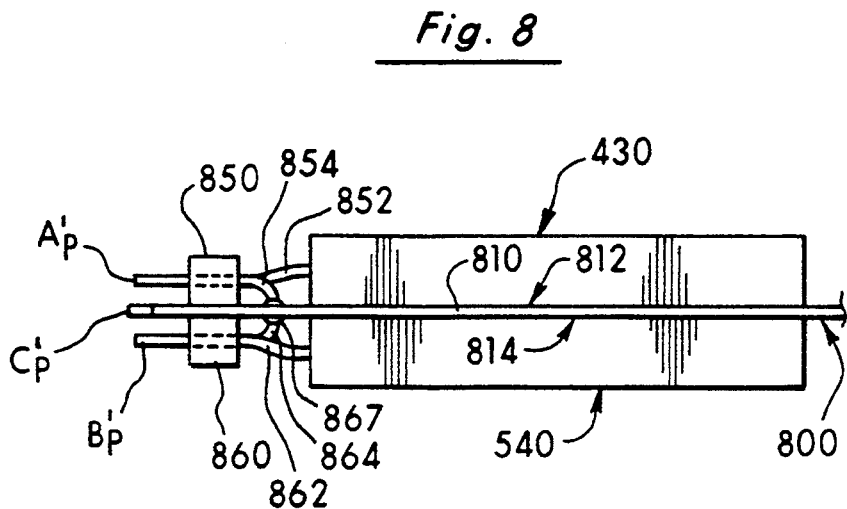

MMDS/ITFS BI-DIRECTIONAL OVER-THE-AIR TRANSMISSION SYSTEM AND METHOD THEREFOR

BACKGROUND OF INVENTION

1. Related Invention

This application is a continuation-in-part of "MMDS OVER-THE-AIR BI-DIRECTIONAL TV/DATA TRANSMISSION SYSTEM AND METHOD THEREFOR" filed Apr. 16, 1993, Ser. No. 08/048,985.

2. Field of the Invention

The present invention relates to a wireless system utilizing microwave frequencies to provide bi-directional transfer of programming and information between a common focal point and a plurality of remote locations. More specifically, the present invention relates to the use of Multichannel Multipoint Distribution System (MMDS) frequencies to receive programming at remote locations and Instructional Television Fixed Service (ITFS) response frequencies to transmit information/data from remote locations in a combined bi-directional converter and a dual polarity isolated feed system.

3. Statement of the Problem

Consumers receive television programs one of four ways. Historically, television programing was broadcast from a central antenna to a number of rooftop antennas within a given radius of a transmitting tower. Cable then became available and allowed a much higher quality delivery of television programming to a consumer's household. While the quality of the programming substantially increased, the consumers encountered a significant increase in costs for such programming. Satellite dish antennas (TVRO) represent a third delivery system. An individual consumer pays several thousand dollars for the TVRO delivery system and also pays a monthly charge for the programing. TVRO systems allowed consumers in rural areas, however, to receive high quality programming via satellite where conventional television signals and cable would not provide delivery. The fourth type of delivery system is commonly called "wireless cable."

In a sense, wireless cable represented a return to the historic conventional delivery of television signals. A consumer purchased a rooftop microwave antenna and pointed it to a common microwave transmission source usually mounted on the top of a tower or a high location such as a mountain top. The initial "wireless cable" systems operated on the Multipoint Distribution System (MDS) frequency range of 2150 MHz to 2162 MHz. Limited programming over one or two channels was provided under the MDS frequencies. With the advent of Multichannel Multipoint Distribution Systems (MMDS), in a frequency range of 2500 MHz to 2686 MHz, a plurality of channels could be simultaneously provided to the rooftop microwave antenna. MMDS "wireless cable" systems are becoming popular nationwide and, in fact, worldwide, principally in comparison to the much greater expense of purchasing and installing of cable. For example, in a community of multi-acreage home sites, the laying of cable would be prohibitively expensive whereas provision of wireless cable to such sites would be significantly less.

Developing simultaneously with the development of television programming systems, as described above, is the need to provide feedback from the consumer to the program delivery source such as, for example, pay per view (PPV) systems. Cable systems have the unique advantage of providing a solid two-way connection path between the consumer and the source of programming. In TVRO and wireless cable systems, no such link exists and the consumer must rely on making a phone call to the programming source (or other location) to order pay per view programming. Pay per view programming is used as an example and it is to be understood that many other services contemplate a return data transmission path from the consumer to the source of programming (for example, ordering of merchandise, computer data, etc.).

General Instruments currently manufactures a set top that provides for a standard telephone hook up for sending data back to the billing computer. This system is identified as Model No. 1507 MU and is available from General Instruments, 2200 Byberry Road, Hatboro, Pa. 19040. This system is easily installed by a customer to access pay per view programming. Hooking up a telephone line to every set top, however, is costly and the customers are sometimes on a long distance exchange or party line.

A need exists for a wireless cable system to provide a return over-the-air information/data path back to the source of programming. The system implementing this must provide the return data path using the available frequencies and at a low cost to the consumer. The service must use the existing equipment as much as possible.

Presently, Instructional Television Fixed Service (ITFS) response frequencies (2686.0625 MHz to 2689.8125 MHz) are being considered for use as return link frequencies by the FCC. See FCC General Docket No. 90-60. This approach is somewhat expensive and elaborate due to the fact that the receive and transmit frequencies are so close to one another—normally requiring separate receive and transmitting antennas. The power required for the return link is relatively small (less than 100 milliwatts) but, due to the close proximity of the frequencies, overload of the receive down converter could be a problem. Another problem exists with using ITFS response frequencies in that interference and disruption of the service may result. The close proximity of ITFS response frequencies (2686.0625/2689.8125 MHz) to ITFS/MMDS band (2500/2686 MHz) would require physically large, high Q and expensive filters to minimize interference between transmit and receive signals.

A need, therefore, exists to enable wireless cable operators and users to economically utilize the ITFS response frequencies for pay per view programming, computer links, banking, home shopping, medical alarm, and fire/security as well as to receive standard programming at a minimum cost. Heretofore, this has only been available to wireless consumers through use of standard telephone hookups.

4. Solution to the Problem

The present invention provides a solution to the above stated problem by providing a two-way or bi-directional over-the-air transfer of programing and information/data between a common transmission point such as a tower and each of a plurality of remote locations such as consumers' houses. The present invention accomplishes this by utilizing the same microwave antenna at a consumer's house for receipt of programming and for transmission of data. A unique bi-directional converter and dual polarity isolated feed system is utilized to receive and to down convert the MMDS microwave programming signals and to up convert and to transmit the ITFS response microwave data signals. The converter operates using overlapping or common components to minimize the cost to the consumer. The present invention utilizes a mast-mounted receive/transmit converter which incorporates a common local oscillator to down convert incoming MMDS microwave television signals while simultaneously up converting outgoing ITFS response information and data signals to the transmission tower. Separate receive and transmit dual polarity isolated feeds are utilized on a single printed circuit board sharing a common semi-parabolic reflector. The bi-directional converter may be integrated into the support boom for the feeds or mounted behind the reflector. Interference between the MMDS and ITFS bands is minimized by using a dual feed with the feeds electrically isolated and with the MMDS and ITFS bandpass filters located on the opposite sides of a printed circuit board. A guard band may also be provided in one embodiment between the MMDS frequencies and the ITFS response frequencies to further minimize interference.

SUMMARY OF THE INVENTION

A bi-directional MMDS/ITFS converter and dual polarity isolated feed system is disclosed which is connected to an antenna for receiving MMDS programming from an antenna and which is further connected to a communications line for receiving information/data signals from a set top for retransmission of ITFS response signals back to a central location. The converter may be housed within the support boom for the feed or mounted behind the antenna.

The present invention sets forth a bi-directional converter having a down converter operative with a first feed for down converting the conventional MMDS programming signals and a band separator for delivering these signals out from the bi-directional converter to a communications line in a first range of frequencies.

The present invention incorporates an up converter operative with the band separator for up converting data/information signals in a second range of frequencies from the communications line as separated by the band separator from the converted programming signals being simultaneously transferred. The up converter converts the data/information signals into ITFS response data signals and delivers them into a second feed for transmission.

The bi-directional MMDS/ITFS response converter of the present invention uses a common local oscillator for driving both the down converter and the up converter and commonly shares the band separator. The first and second feeds also commonly share the same reflector and are printed on a single printed circuit board.

A guard band of frequencies is provided, in one embodiment, to provide further isolation between the MMDS and ITFS response frequencies.

BRIEF DESCRIPTION OF THE DRAWING

FIG. 1 illustrates the present invention in the environment of a wireless cable system, FIG. 2 sets forth the present invention, in block diagram format, of the various components contained therein at the location of the remote consumer, FIG. 3 sets forth the present invention, in block diagram components at the location of the common transmitter, FIG. 4 sets forth the details of the bi-directional converter of the present invention, FIG. 7 is a planar view of one side of the bi-directional converter board of the present invention, FIG. 8 is a side view of the bi-directional converter board of the present invention shown in FIG. 7, FIG. 9 sets forth a planar view of the detail showing the connection both physically and electrically of the bi-directional converter board to the dual polarity isolated feed printed circuit board.

DETAILED SPECIFICATION

1. Overview

Figure 4:
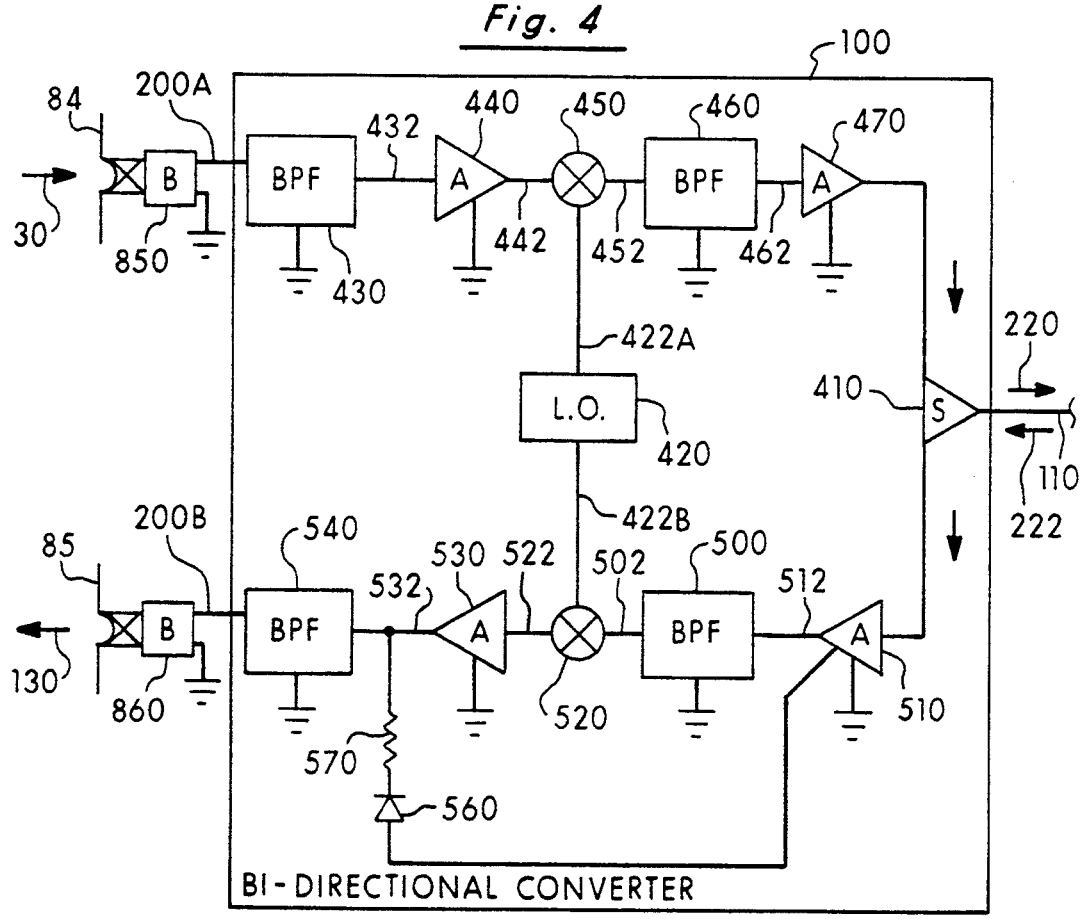

In FIG. 1, the present invention is illustrated in the environment of a conventional MMDS "wireless cable" system. The common antenna 20 is located at a central or common focal point 10. The microwave transmitter 20 transmits MMDS programming signals 30. Typically, the programming signals 30 are delivered from a satellite 40 which provides programming 50 to a base station 60. At the base station is a set of electronics 70 which in turn causes the programing to be transmitted as programing 30 to a rooftop antenna 80 located on the roof of a consumer's house 90. The antenna 80 has a reflector 82, a feed 88 located in the focal area of the reflector by a support boom 86 and a down converter 100 which down converts the MMDS programming signals and delivers programming over communications link 110 to TV 105. This is a typical prior art system for receiving MMDS programming from the common transmitter 20. The plurality of houses 90 simultaneously receives the programming 30 on a variety of channels.

The present invention significantly improves upon the above described conventional programming delivery system by enabling each location 90 to transmit, at ITFS response frequencies, information/data back to antenna 20 at the common transmission location while sharing common equipment. In FIG. 1, each location 90 is provided a set top converter 120 which permits the consumer to input data or information. The set top converter is connected to a data interface device 125 which provides data up cable 110 to the bi-directional converter 100 of the present invention. The bi-directional converter 100 may be integrated into the support boom 86 for the feed of the antenna 80 in one embodiment of the invention. The data is up converted and the antenna 80 transmits the data as ITFS response signals 130 to the common microwave antenna 20 which is also configured to receive this signal and to deliver the data to the central location 70 for processing. It is to be understood that the set top converter 120 could also comprise a personal computer or any other suitable type of device.

In this fashion, a two-way communication link is provided between antenna 80 and antenna 20 wherein antenna 20 commonly transmits programming 30 over MMDS frequencies to a plurality of rooftop antennas 80 and wherein each of the plurality of rooftop antennas 80 is capable of independently, but simultaneously, up converting outgoing data over the ITFS response frequencies.

The combined bi-directional converter 100 and dual polarity isolated feed 88 of the present invention is the heart of the operation of the present invention and permits such two-way communication to utilize existing rooftop antennas 80 and to share common components.

The present invention offers significant advantages. By eliminating the use of phone lines, the present invention has a lower cost. By providing a self-contained system, the use of an outside entity such as a telephone company is not required. Combining return information into the existing wireless cable design increases control and reliability while providing less interference and disruption of the service.

The present invention, in the preferred embodiment, utilizes all of the MMDS frequency groups of A through G except the following two group/channel bandwidths of H3 (i.e., 2674–2680 MHz) and G4 (i.e., 2680–2686 MHz). These two bandwidths under one embodiment of the present invention are not used and are combined together to provide a guard band of 2674–2686 MHz. The use of such a guard between the modified MMDS band (i.e., 2500 to 2674 MHz) and ITFS response band (i.e., 2686.0625 to 2689.8125 MHz) minimizes interference between the MMDS reception and the ITFS transmission by allowing the respective bandpass filters to be tuned for attenuation of the other band. The MMDS filter (430 of FIG. 4) can be tuned for minimum loss at 2674 MHz and maximum loss at 2686 MHz and above, whereas the ITFS response filter (540 of FIG. 4) can be tuned for minimum loss at 2686 MHz and maximum loss at 2674 MHz and below. Depending on the number of elements employed in each filter, the amount of isolation between bands can be 6 to 10 dB or higher. This isolation is essentially important when continuous transmission of data 130 occurs with simultaneous reception of programming 30. This teaching provides a guard bandwidth of 12 MHz, a programming bandwidth of 174 MHz, and a transmit data bandwidth of about 3.8 MHz.

The following chart illustrates the frequency relationships:

TABLE I

| Band | Function | Frequency Range in MHz |
|---|---|---|
| MMDS | Receive Programming | 2500–2674 |
| Guard | Minimize Interference | 2674–2686 |
| ITFS | Transmit Data | 2686.0625–2689.8125 |

It is to be expressly understood, and will be explained subsequently, that the bi-directional converter and dual polarity isolated feed of the present invention is not limited to the above MMDS/ITFS response frequency ranges or to the use of a guard band and that the concepts contained in the present invention find application in other uses and applications especially in other foreign countries with different frequency allocations.

2. Remote Location

Figure 2:
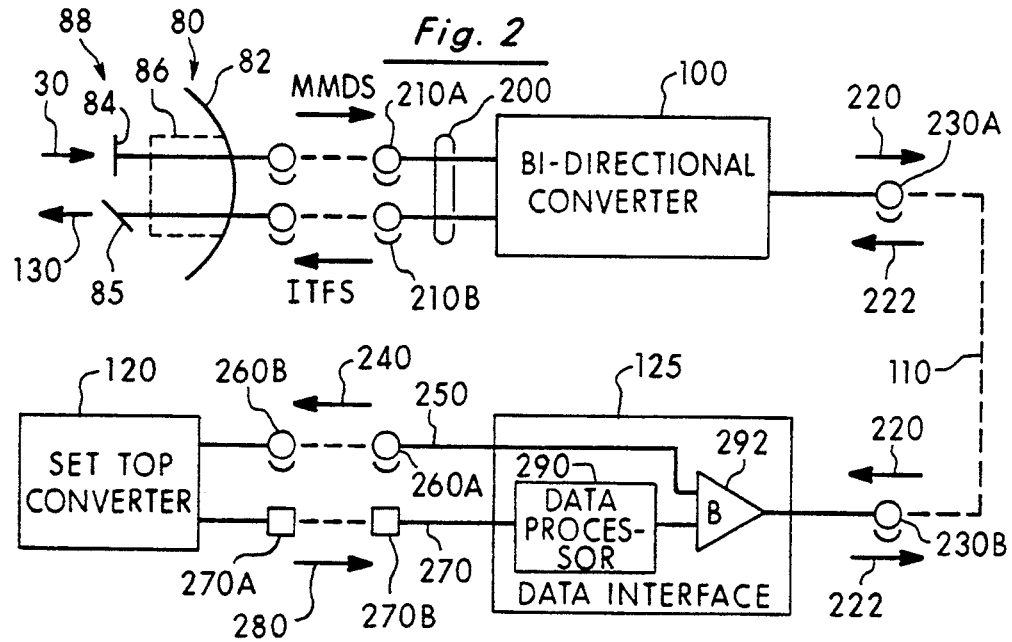

In FIG. 2, the details of the components located at the remote location such as a consumer's house 90 are set forth. The four basic components of FIG. 1 are illustrated: the antenna 80 with reflector 82, support boom 86, feed 88 and the bi-directional converter 100; the data interface 125; and the set top converter 120. The feed may have a sub-reflector not shown.

The reflector 82 is conventional such as that fully disclosed in U.S. Pat. No. 5,191,350, entitled "Low Wind Load Parabolic Antenna" issued Mar. 2, 1993 and commonly owned by the present assignee. Under the teachings of the present invention, a first microwave feed 84 for receiving MMDS signals 30 and a second microwave feed 85 for transmitting ITFS response signals 130 printed on a single printed circuit board are utilized. The microwave signals are delivered to and from the bi-directional converter 100 over link 200.

In operation, the antenna 80 conventionally receives signals 30 which are delivered in the standard MMDS frequency range (2500 MHz to 2686 MHz) or the modified MMDS range (2500 MHz to 2674 MHz). The term "modified MMDS range" is used when the guard band is incorporated. For sake of clarity, MMDS as used hereafter shall refer to both the standard MMDS band and the modified MMDS band of Table I. Under the teachings of the present invention, the antenna 80 also transmits information/data as represented by signals 130 in the ITFS response frequency range (2686.0625 MHz to 2689.8125 MHz).

The first and second feeds 84 and 85 are unique to the present invention and are more fully discussed later.

The bi-directional converter 100 of the present invention is interconnected to antenna 80 over link 200. In the embodiment of FIG. 2, link 200 illustrates two common coax connections 210A and 210B. The connections 210A and 210B are for purposes of illustration only and it is to be understood that a number of different approaches can be used to connect the bi-directional converter 100 to the antenna 80. In this embodiment and as shown in FIG. 1, the bi-directional converter 100 would be mounted to the rear of the antenna 80. It is to be expressly understood that the physical location of the bi-directional converter and the means of interconnecting it to the antenna 80 can vary, under the teachings of the present invention, from application to application. The bi-directional converter 100, under the teachings of the present invention, is coupled to the dual polarity isolated feeds 84 and 85 so as to down convert MMDS signals 30 carrying programming and to up convert data and information into ITFS response signals 130 with minimal interference.

The bi-directional converter 100 will be discussed in more detail later. The bi-directional converter 100 connected to communications line 110, however, functions to down convert the MMDS frequencies into a first communication frequency range of 222 to 396 MHz as represented by arrows 220 and to up convert frequencies in a second communication frequency range of 409 to 411 MHz as represented by arrows 222 to the ITFS response frequency range. Again, communications link 110, in the present invention, is a coax cable having conventional coax connectors 230A and 230B. As shown in FIG. 2, coax 110 delivers the MMDS signals 220 from the bi-directional converter 100 usually located on the antenna 80 downwardly into a consumer's house to the data interface device 125.

The data interface device 125 functions to deliver programming as represented by arrow 240 over coax connection 250 to the set top converter 120 or directly to the receiver 105. Again, the coax connection 250 has conventional coax connectors 260A and 260B. The data interface 125 receives data, such as digital data, over lines 270 and conventional connections 270(a) and (b). The data interface device 125 functions to deliver the programming signals 240 to the set top converter 120 from the bi-directional converter 100 and to process the digital signals from the set top converter 120 (or from an alternate source such as a personal computer) into data signals 222.

As shown in FIG. 2, the conversion of data 280 into signals 222 is accomplished through use of a data processor 290. A band separator 292 is used to deliver programming signals 240 to the set top converter 120 and to deliver data signals from the data processor 290 simultaneously to coax 110. The band separator 292 is preferably a low pass/high pass separator wherein the low pass cut-off is 396 MHz (i.e., the upper end of the first frequency range) and the high pass cut-off is 409 MHz (i.e., the lower end of the second frequency range). The data processor 290 is an up converter converting 10 MHz or other signals carrying data as may be sent out of set top converters or other sources to the required 409 to 411 MHz range.

The set top converter 120 delivers the programming signals 240 to the television set 105 and generates the information/data signals 280 such as for pay per view and the like. It is to be understood that the connections 250 and 270 between the set top 120 and the data interface 125 are by way of example and that other approaches could be used. For example, a single cable connection could be used. Furthermore, the data interface 125 could be incorporated directly into the set top converter.

In summary, FIG. 2 sets forth the components at one of the remote locations 90. In operation, MMDS programming signals 30 are received by antenna 80, reflected into the first feed 84, and delivered through link 200 to the bi-directional converter 100. Bi-directional converter 100 then converts the received programming signals in the MMDS range into a first communication range of frequencies such as in the 222 to 396 MHz range and delivers them on communications line 110 as programming signals 220. The actual frequencies in the first range are a matter of design choice and are not meant to limit this invention. The data interface 125 decouples these signals and delivers them over link 250 as shown by programming signals 240 either into the television 105 or into the set top converter 120. Simultaneously, the set top converter 120 delivers information/data signals 280 over link 270 into the data interface 125, which delivers the data signals 222 in a suitable range of frequencies such as in a second communication range of 409 to 411 MHz over link 110 and into the bi-directional converter 100. Again, the actual frequencies in the second range are a matter of design choice and are not meant to limit this invention. The bi-directional converter 100 up converts the signals carrying data 222 from communications line 110, and delivers them over communications link 200 into the second feed 85 of the antenna 80, for transmission as ITFS response data signals 130. Hence, the bi-directional converter 100 can simultaneously up link and down link signals which, according to the preferred embodiment of the present invention, use the MMDS microwave frequency range to carry programming and the ITFS response microwave frequency range to carry data.

3. Common Transmitter Location

Figure 3:
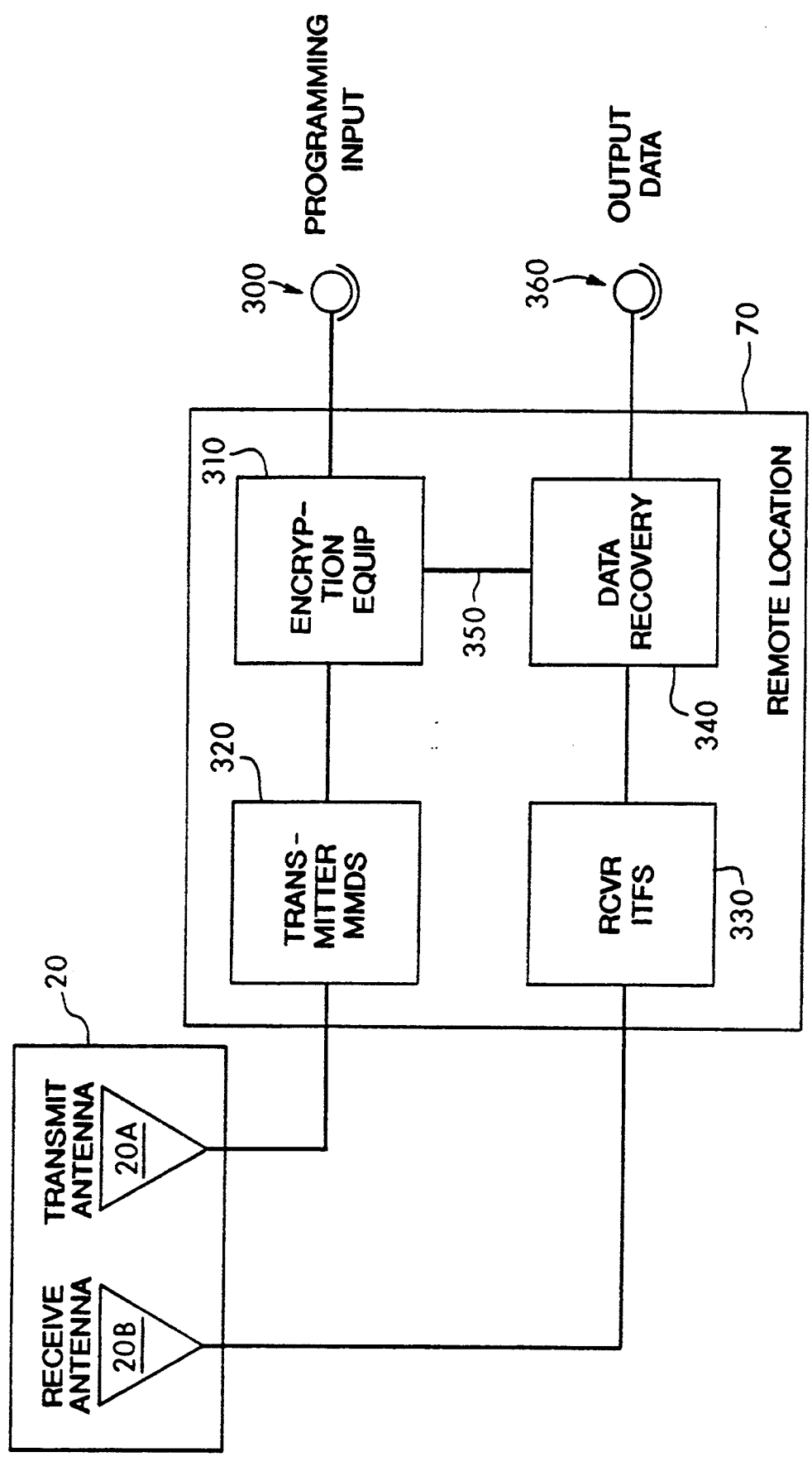

In FIG. 3, the general components at the common transmit location 70 are shown. The common transmitter and antenna 20, in one embodiment, simultaneously transmits and receives signals 30 and 130. In another embodiment, the transmit antenna 20(a) and the receive antenna 20(b) are separate antennas at the same location. Programming is received at input 300 such as from a satellite dish antenna 60. The programming may be selectively delivered through encryption equipment 310 before delivery into the transmitting electronics 320. Such electronics are conventional in the MMDS industry.

The receive antenna receives the antenna signals 130 and delivers them into an ITFS response receiver 330. ITFS response receivers 330 are conventionally available having been used for receiving ITFS response programming. However, the data recovery circuit 340, under the teachings of the present invention, receives the ITFS response signal and recovers data and information therefrom. In one embodiment, the signals are delivered over lines 350 into the encryption unit 310, and in another embodiment, the signals are delivered over lines 360 as data for downstream use. In a pay per view environment, the encryption unit 310 is activated by signals on line 350. In another embodiment, such as purchasing goods and materials over a home catalogue network, the data signals 360 are delivered outwardly from the system.

In summary, at the common remote location 70, the MMDS programming signals are conventionally delivered and the ITFS response signals are modified to carry information and data, as taught in the above section, and the information and data are recovered, either to activate suitable encryption equipment or to deliver data outwardly from the system.

4. Bi-Directional Converter

A preferred embodiment of the bi-directional converter of the present invention is set forth in FIG. 4. The bi-directional converter 100 utilizes a common band separator 410 and a common local oscillator 420. The converter 100 receives the MMDS signals from line 200A and delivers them into a bandpass filter 430 designed for the conventional MMDS groups A through G (or designed for the modified MMDS groups as set forth in Table I). An example of a filter 430 would be an MMDS interdigital filter. The output of the filter 430 is delivered into an RF amplifier 440 which delivers the signal into a mixer 450 and from the mixer 450 into a bandpass filter 460 from which it is then amplified by amplifier 470. The amplified programming signals are then delivered through the band separator 410 onto communications line 110 as programming signals 220.

The operation of the MMDS filter 430, the RF amplifier 440, the mixer 450, the bandpass filter 460 and the amplifier 470 are conventional and the design of this, in one embodiment, is based upon the assignee's commercially available Model QL-3010 down converter which is based upon U.S. Pat. Nos. 4,791,717 and 5,020,149.

In operation, the local oscillator 420 operates at a fixed frequency such as 2278 MHz and delivers a signal into the mixer 450 which down converts the MMDS signals into programming signals 220.

The return information path operates as follows. The signals carrying data 222 are received on communications line 110. These data signals 222 are delivered simultaneously with the programming signals 220 and the band separator 410 separates the data signals 222 and delivers them into an amplifier 510 and then into a bandpass filter 500. The amplified signals are then delivered into a mixer 520 for downstream delivery into an RF amplifier 530 which delivers its output into the ITFS response bandpass filter 540. Amplifier 510 may also have level limiting circuitry to control the gain of the amplifier to be within any required FCC transmission rules such as, for example, 100 milliwatts. The output of ITFS response filter 540 is delivered as the outgoing ITFS response information/data signals over link 200B. Again, filter 540 in the preferred embodiment is an interdigital filter. Diode 560 and resistor 570 provide feedback amplifier 510 which is an automatic gain control amplifier (AGC).

Bi-directional converter of FIG. 4 utilizes a common local oscillator 420 which results in design costs savings for the present invention. The bi-directional converter in FIG. 4 is integrated into a single housing which further reduces the cost of the overall invention. This particular design is important in that a single converter is utilized to down convert the MMDS signals while simultaneously up converting the ITFS response signals.

5. Method of Operation

In reference to FIG. 2, the method of the present invention provides a bi-directional converter which simultaneously down converts MMDS programming signals 220 while simultaneously up converting data signals 222 into ITFS response data signals 130.

With reference to FIG. 4, the converter 100 simultaneously receives MMDS programming signals 30 from antenna 80 while transmitting ITFS response data signals 130 out. The dual feed 88 receives MMDS programing signals to the down converter 430, 440, 450, 460, and 470 while simultaneously transmitting ITFS response data signals from the up converter 510, 500, 520, 530, and 540. The down converter and the up converter commonly use the same local oscillator 420 for conversion. The common band separator 410 simultaneously receives the converted programming signals and delivers them on the communication link 110 as signals 220 and simultaneously receives the signals carrying data 222 and delivers them to the up converter.

The system of the present invention receives the incoming MMDS programming signals at one polarity and transmits ITFS response data signals at a second polarity due to the orthogonal arrangement of feeds 84 and 85. This provides further minimization of interference.

6. Dual Polarity Isolated Feed 88

Figure 5:
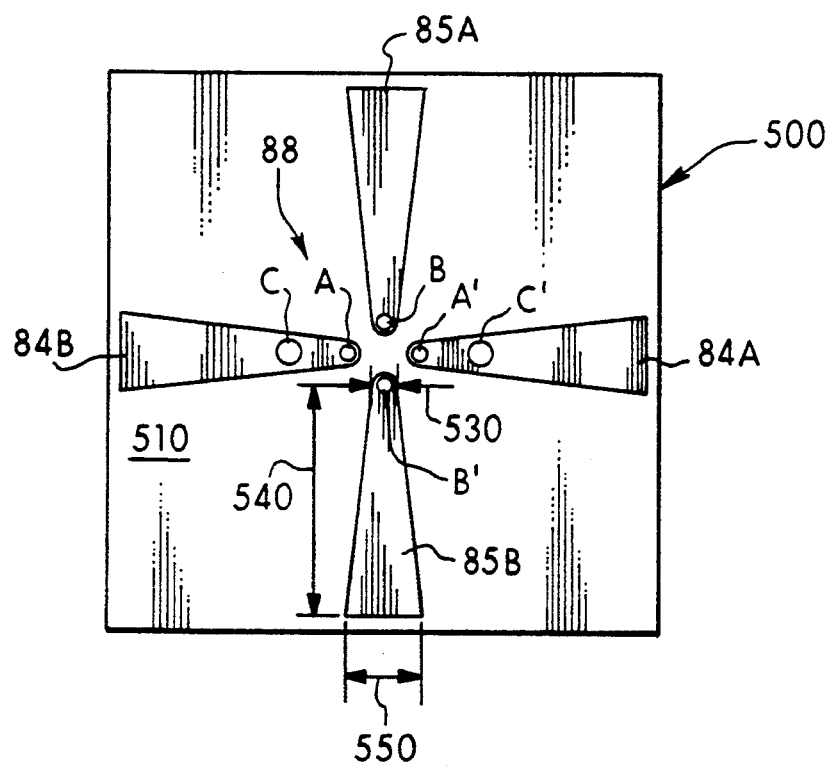
FIG. 5 is one side of the dual polarity isolated feed printed circuit board of the present invention illustrating the ITFS dipole and the MMDS dipole.
Figure 6:
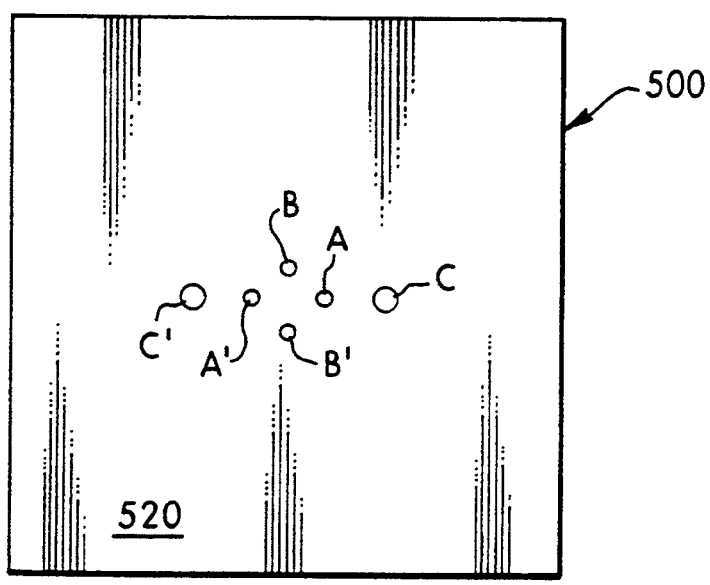
FIG. 6 is the opposite side of FIG. 5 and illustrates the connection points for physically and electrically connecting the bi-directional converter board to the dual polarity isolated feed printed circuit board.

In FIGS. 5 and 6, in the preferred embodiment, the first and second feeds 84 and 85 (dual polarity isolated feed 88) are shown arranged orthogonally to each other on a printed circuit board 500. The printed circuit board 500 is held in the focal area of the reflector 82 by the support boom 86. The printed circuit board 500 has a first side 510 and a second opposing side 520. On the first side 510 are printed dipole elements 85A and 85B which form a printed dipole 85 centered on the printed circuit board 500 and dipole elements 84A and 84B which form a printed dipole 84 centered on the printed circuit board 500. The printed circuit board 500 in the preferred embodiment is 0.063 inch thick. The dimensions of the printed circuit board 500 are 2.700×2.700 inches. Each half-dipole element is in the shape of an isosceles triangle which tapers from a maximum width 550 of 0.400 inch to a minimum width 530 of 0.050 inch. Each half-dipole element is preferably 1.200 inches long 540. These dimensions are the preferred embodiment. The isosceles shaped half-dipole elements have their ends 530 inwardly directed toward each other. The spacing between holes A—A' and B—B' is in the range of about 0.25 to 0.30 inch. The distance between C—C' is preferably about 10 inch. Holes A, A', B, and B' are balun electrical connection points whereas holes C and C' are dipole printed circuit board to electrical circuit board physical connection points, as will be subsequently explained.

The dual feed 88 has the polarity of the two feeds 84 and 85 separated by 90° and the two feeds are not electrically connected (i.e., electrically isolated). Positioning the two feeds at 90° and with no direct connection from one feed to the other provides maximum isolation between the feeds and minimizes interaction between MMDS and ITFS response frequencies.

7. Bi-Directional Down Converter 100

In FIGS. 7 and 8, a printed circuit board 800 is shown which is designed to fit within the support boom 86 for the feed 88 of the antenna 80. In FIGS. 7 and 8, only the input end 810 of the printed circuit board 800 is shown. Mounted on opposing sides 812 and 814 are the respective bandpass filters 430 and 540. Placing the bandpass filters 430 and 540 on opposite sides of the printed circuit board 800 functions to minimize interference between the ITFS response and MMDS frequency ranges and further functions to provide an inexpensive approach by combining both filters onto a single printed circuit board 800. Two baluns 850 and 860 are provided. The term "balun" is conventional for "balance to unbalance transformer" and functions to couple the balanced feed dipole to the unbalanced bandpass filter. FIG. 14 illustrates a single balun 850 having four input and four output leads. However, the two inner leads on each side are criss-cross connected to the two primary input leads $A_p$ and $A'_p$ and to the two primary output leads 852 and 854. In the following drawings of FIGS. 7 to 13, only the primary leads are illustrated for clarity. In this case, the baluns 850 and 860 are of conventional design. Balun 850 has electrical connection points $A_p$ and $A'_p$ to feed 84 and balun 860 has connection points B and $B'_p$ to feed 85.

The feed isolation, guard band isolation, and location of the bandpass filters on opposite sides of printed circuit board 800 all combine to minimize interference between MMDS programming and ITFS response signals.

The printed circuit board 800 at its extreme input end 810 has two physical connection points of $C_p$ and $C'_p$ which extend outwardly from input end 810 as shown in FIG. 8. A recess 870 is also provided and whose function will be described later. Edges 816 are also provided midway between the recess 870 and the sides of the printed circuit board 800. The edges 816 of the printed circuit board 800 of FIG. 7 abut against surface 520 of the feed printed circuit board 500 of FIG. 6 so that the connection points $C_p$ and $C'_p$ extend through holes C and C' respectively.

Figure 9:
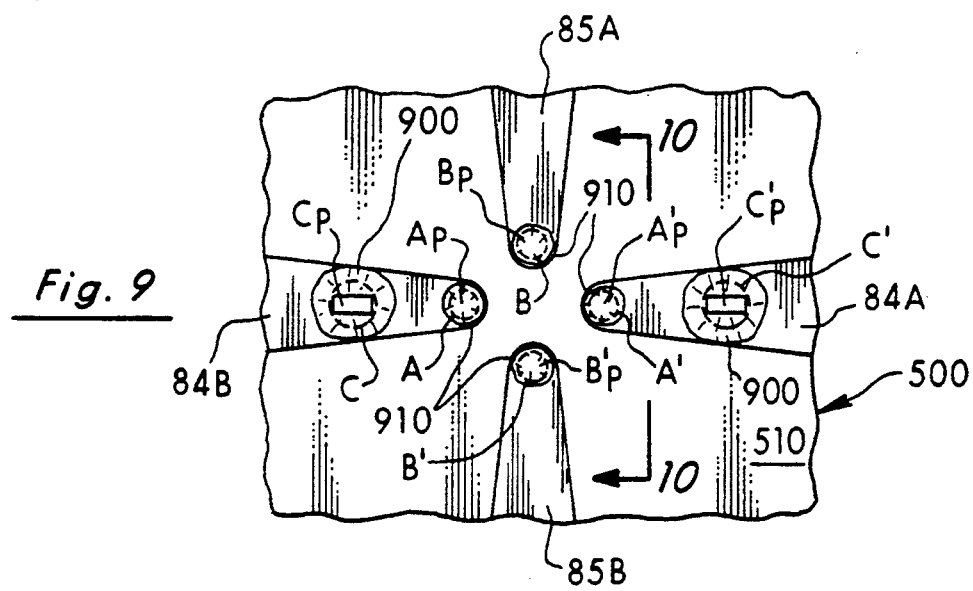

As shown in FIG. 9, the contact points $C_p$ and $C'_p$ fit within the formed holes C and C' and then are soldered 900 to the dipoles 84A and 84B as illustrated. Metallic surfaces are provided on the surfaces of $C_p$ and $C'_p$ so that they can be soldered. Likewise, the ends of the baluns 850 and 860 also fit in their respective formed holes and are soldered 910 to the dipoles 84 and 85. For example, connection $A_p$ of balun 850 fits within formed hole A and is soldered 910. The printed circuit board 800 perpendicularly abuts against the center of the feed printed circuit board 500 and forms a rigid relationship therewith and is firmly held to the printed circuit board 500 by the six soldered connection points, A, B, C, A', B', and C'.

Figure 10:
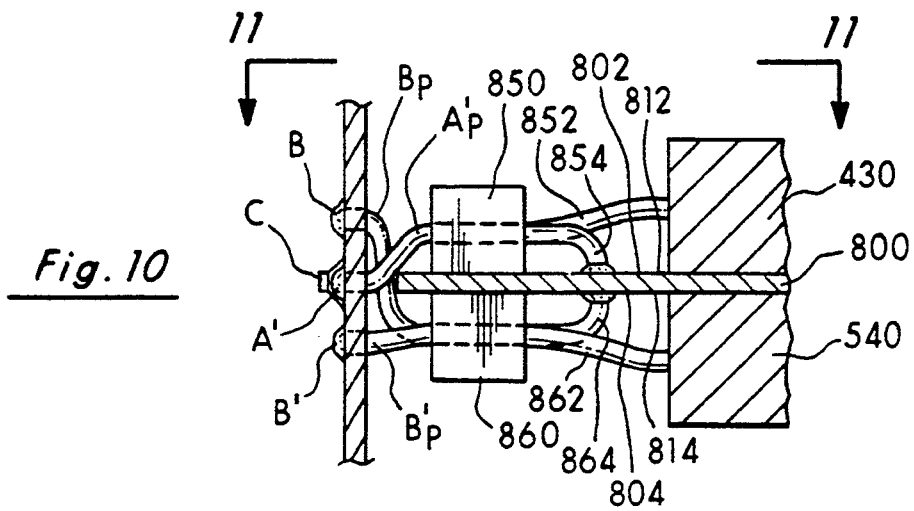
FIG. 10 is a cross sectional view of FIG. 9 detailing the connection of the bi-directional converter board to the dual polarity isolated feed printed circuit board.
Figure 11:
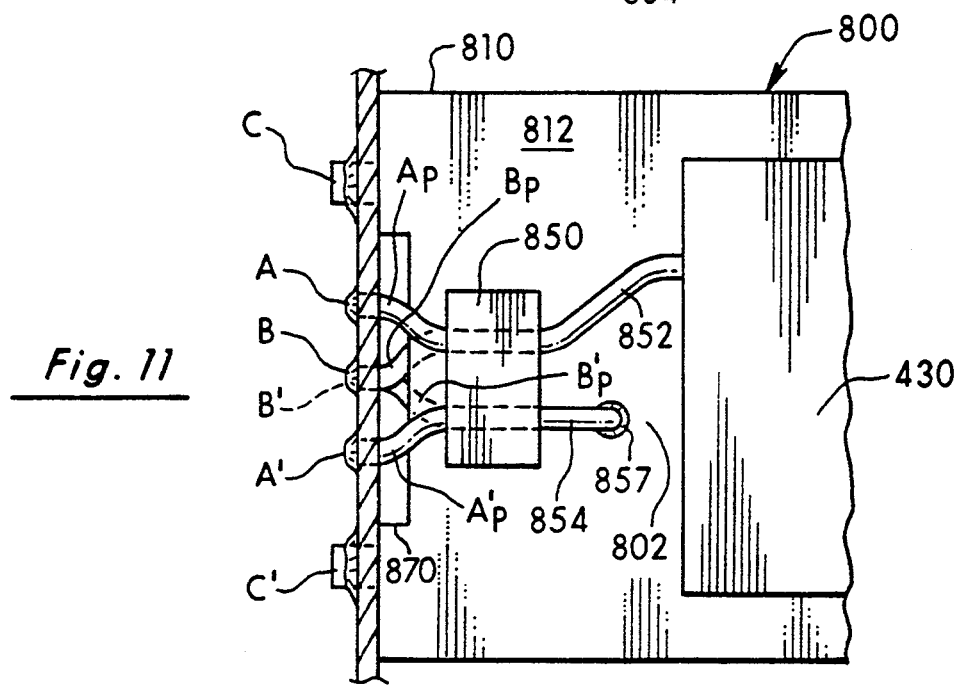
FIG. 11 is a top planar view of FIG. 9 detailing the electrical and physical connection of the bi-directional converter printed circuit board to the dual polarity isolated feed printed circuit board.

This is better illustrated in FIGS. 10 and 11. FIG. 11 is a view taken along lines 11—11 of FIG. 10. In FIG. 11, the formed recess 870 provides the leads $A_p$, $A'_p$, $B_p$ and $B'_p$ space to selectively interconnect to the formed holes A, A', B, and B'. FIGS. 10 and 11 show the crisscross interconnection that must occur to connect the two baluns 850 and 860 to the two dipoles 84 and 85. Lead 854 is soldered 857 to the ground plane 802 on side 812 and lead 852 is the input to the filter 430. Likewise, lead 864 is soldered 867 to the ground plane 804 on side 814 and the lead 862 is the input to filter 540.

Figure 12:
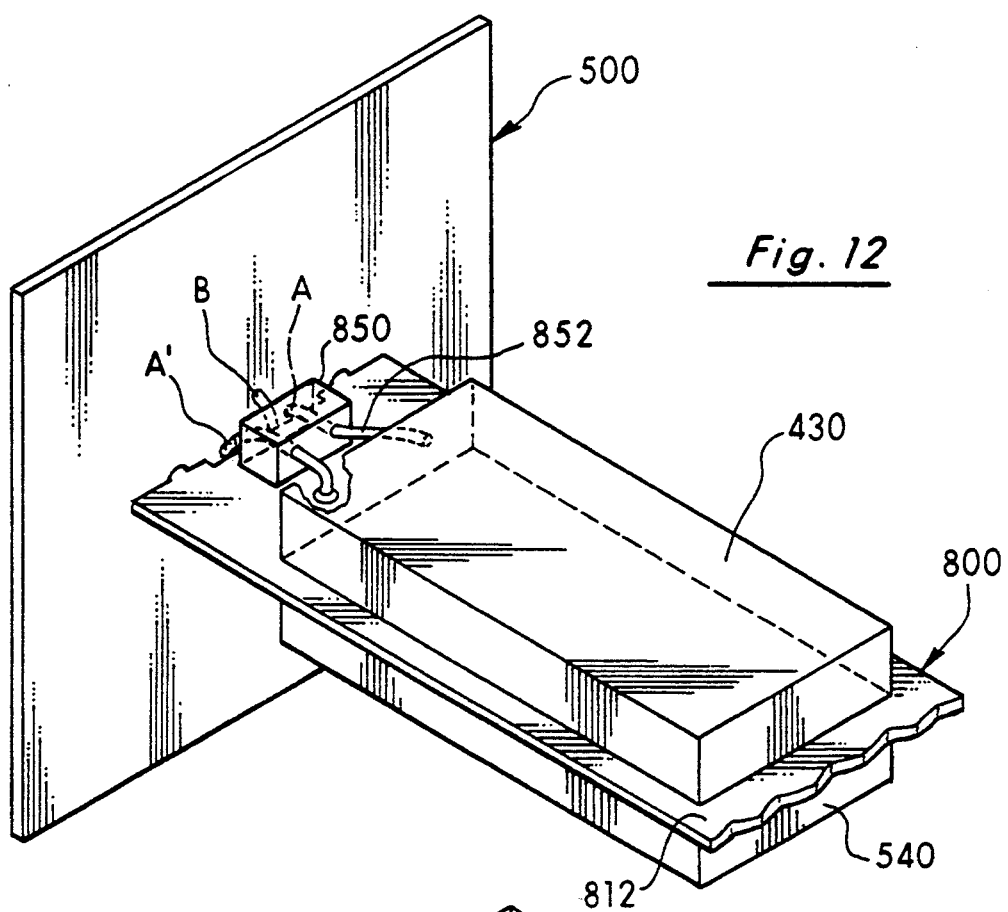
FIG. 12 is a perspective view showing the backside of the dual polarity isolated feed printed circuit board in connection both physically and electrically with the bi-directional converter printed circuit board.
Figure 13:
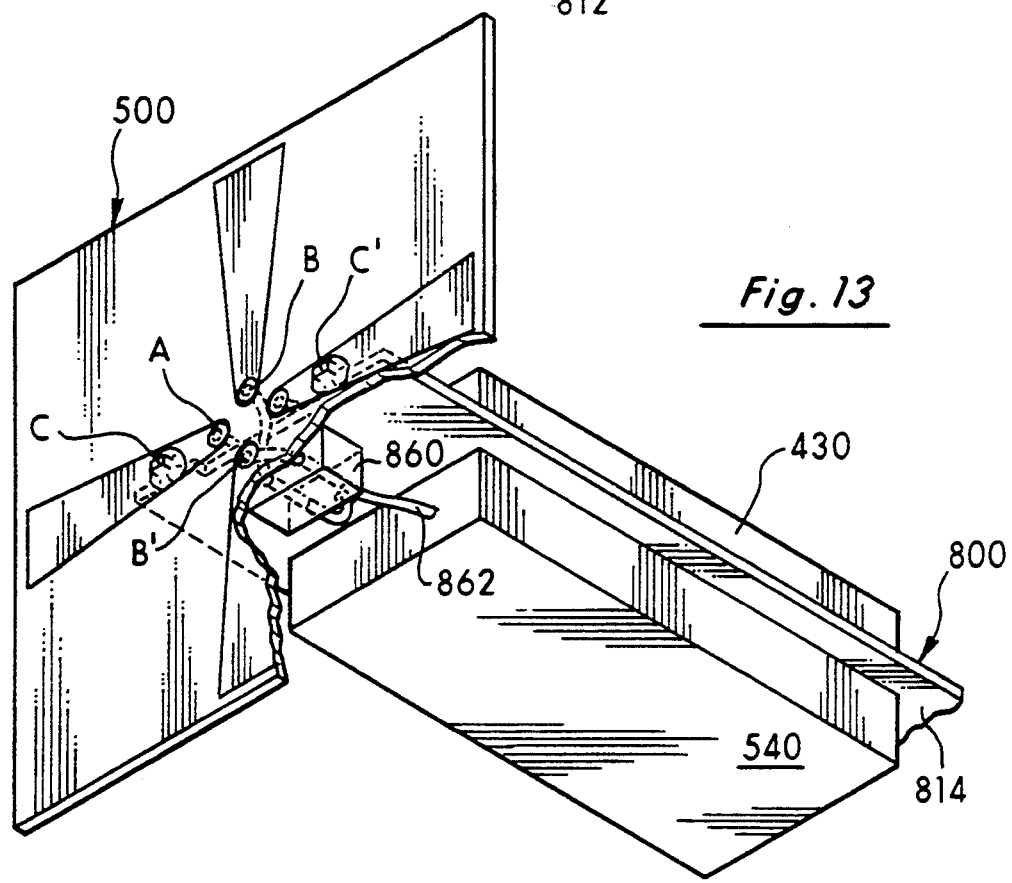
FIG. 13 is a front perspective view illustrating the physical and electrical connection of the dual polarity isolated feed printed circuit board with the bi-directional converter printed circuit board, FIG. 14 sets forth the details of the input/output connections of a balun.

In conclusion, the present invention, as shown in FIGS. 12 and 13, provides a rigid connection of the dual polarity isolated feed printed circuit board 800 to the converter printed circuit board feed 500 so that the balun 860 for the ITFS response frequencies interconnects to the feed 85 and the balun 850 for the MMDS frequencies interconnects with feed 84. The signal paths are electrically isolated with the MMDS signals being delivered to side 812 of the printed circuit board 800 and the ITFS response signals being delivered from opposing side 814 of the printed circuit board 800. This physical mounting arrangement (i.e., on opposite sides of the printed circuit board 800) provides inexpensive isolation between the two microwave frequency bands and further minimizes interference. The construction set forth in FIGS. 5 through 13 is inexpensive.

In FIGS. 12 and 13, perspective views are provided showing the completed unitary assembly. In the preferred embodiment, each balun 850, 860, is approximately ¼ inch by ½ inch and constitutes a dual hole ferrite core. The conductive wires extending outwardly in both directions from each balun are preferably 26 gauge insulated 2-conductor wires.

8. Integrated Bi-Directional Converter

Figure 15:
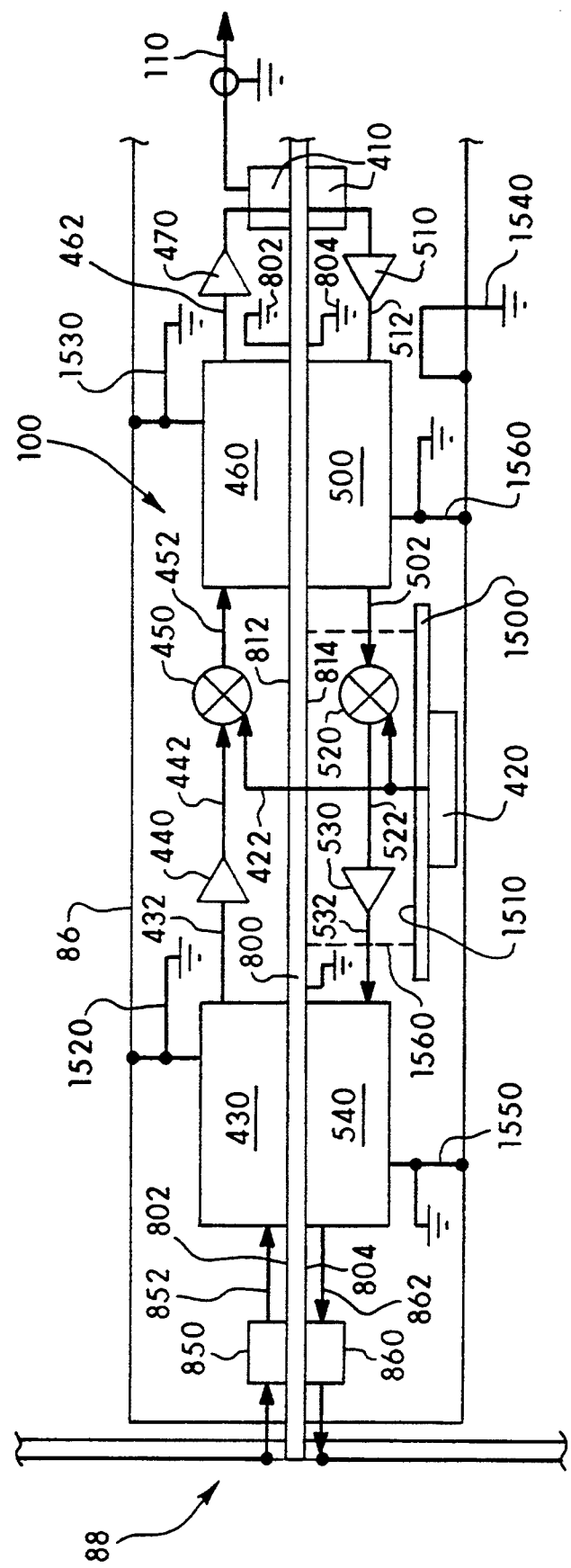
FIG. 15 is an illustration showing the bi-directional converter integrated into a support boom.

In FIG. 15, an integrated bi-directional converter 100 is shown mounted into a support boom 86 incorporating the design of FIGS. 5 to 13. In this embodiment, the bi-directional converter 100 comprises two converter printed circuit boards 800 and 1500. The printed circuit board 1500 is a daughter board mounted with its ground plane 1510 towards printed circuit board 800. The daughter board 1500 contains the local oscillator 420 which delivers the converter signals over lines 422 to the mixers 450 and 520.

The down converter having balun 850, filter 430, amplifier 440, mixer 450, filter 460, and amplifier 470 is mounted on side 812 of printed circuit board 800. Side 812 has a ground plane 802 which is grounded to the outer metal casings of filters 430 and 460 which in turn are grounded by means of clips or the like 1520 and 1530 to the ground 1540 in the support boom 86. Likewise, the up converter comprising amplifier 510, filter 500, mixer 520, amplifier 530, filter 540, and balun 860 is mounted to the opposing side 814 of printed circuit board 800. Side 814 also has a ground plane 804 to which the conductive outer casings of filters 500 and 540 are connected and to which are in turn connected by means of clips or the like 1550 or 1560 to the ground 1540 of the support boom 86. As mentioned, separation of the up converter and the down converter on opposite sides of the printed circuit board 800 and the use of the grounds as set forth in FIG. 15 provide further isolation from interference between the MMDS frequencies and the ITFS response frequencies. The daughter board 1500 is mechanically mounted 1560 from the surface 814 of the printed circuit board 800. The down converter and up converter may be of any conventional circuit design. However, it is to be understood that the design at least include the filters 430 and 540 and the mixers 450 and 520.

9. Non-Integrated Bi-Directional Converter

While the above section sets forth the details for a bi-directional converter 100 integrated into a support boom, it is to be expressly understood that the dipoles 84 and 85 could be conventionally interconnected to the hi-directional converter 100 located at the rear of the antenna 80 as shown in FIG. 1.

It is to be expressly understood that the claimed invention is not to be limited to the description of the preferred embodiment but encompasses other modifications and alterations within the scope and spirit of the inventive concept.

We claim:
1. A bi-directional communications system for receiving programming in a first range of microwave frequencies and for transmitting data in a second range of microwave frequencies, said system comprising:
    an antenna, said antenna receiving said programming in said first range of microwave frequencies, said antenna transmitting said data in said second range of microwave frequencies, said antenna comprising:
        (a) a reflector,
        (b) a first feed for receiving said programming in said first range of microwave frequencies,
        (c) a second feed for transmitting said data in said second range of microwave frequencies, said first and second feeds orthogonally positioned to each other and electrically isolated so as to minimize interference, said first and second feeds mounted in the focal area of said reflector;
    a bi-directional converter connected to said first feed of said antenna for down converting said received programming into programming signals in a first predetermined communication frequency range;
    a receiver;
    a communications link;
    means connected to said hi-directional converter for delivering said programming signals in said first predetermined communication frequency range over said communications link to said receiver;
    means for generating data signals in a second predetermined communication frequency range:
    said bi-directional converter receptive to said data signals in said second predetermined communica- tion frequency range from said generating means for up converting said data signals into said data in said second range of microwave frequencies, said second feed of said antenna receptive to said data in said second range of microwave frequencies from said bi-directional converter for transmitting said data in said second range of microwave frequencies having a polarity 90° from the polarity of said received programming.

2. The system of claim 1 wherein said first range of microwave frequencies is an MMDS band and wherein said second range of microwave frequencies is an ITFS response band.

3. The system of claim 2 further comprising a guard band of microwave frequencies between said MMDS band and said ITFS response band so as to minimize interference.

4. The system of claim 1 wherein said first predetermined communication frequency range is 222 to 396 MHz and said second predetermined communication frequency range is 409 to 411 MHz.

5. A bi-directional converter and feed system connected to a reflector for receiving programming signals in a first range of microwave frequencies and connected to a communications line having signals carrying data for transmitting said data in a second range of microwave frequencies, said bi-directional converter and feed system comprising:
a first feed connected to said reflector for receiving said programming signals in said first range of microwave frequencies,
a local oscillator,
means connected to said first feed and to said local oscillator for down converting said programming signals into converted programming signals in a first predetermined communication frequency range,
means connected to said down converting means and receptive to said converted programming signals for delivering said converted programming signals onto said communications line, said delivering means further receiving said signals carrying said data from said communications line in a second predetermined communication frequency range,
means connected to said delivering means and to said local oscillator for up converting said received signals carrying said data into said second range of microwave frequencies, and
a second feed receptive to said data in said second range of microwave frequencies from said up converting means for transmitting said data at a polarity 90° from the polarity of said received programming signals, said first and second feeds positioned electrically isolated from each other to minimize interference and said first and second feeds being mounted in the focal area of said reflector.

6. The system of claim 5 wherein said first range of microwave frequencies is an MMDS band and wherein said second range of microwave frequencies is an ITFS response band.

7. The system of claim 6 further comprising a guard band of microwave frequencies between said MMDS band and said ITFS response band in order to minimize interferences.

8. The system of claim 5 wherein said first predetermined communication frequency range is 222 to 396 MHz and said second predetermined communication frequency range is 409 to 411 MHz.

9. The system of claim 5 further comprising:
a printed circuit board, and wherein said first and second feeds are printed orthogonal to each other on the same side of said printed circuit board.

10. A bi-directional MMDS/ITFS response converter and feed system connected to a reflector for receiving MMDS programming signals and for transmitting ITFS response data signals, said system connected to a communications line for receiving signals carrying data, said bi-directional MMDS/ITFS response converter and feed system comprising:
a first feed mounted in the focal area of said reflector for receiving said MMDS programming signals,
a local oscillator,
a down converter connected to said first feed and to said local oscillator for down converting said MMDS programming signals into converted MMDS signals in a first predetermined range of frequencies,
a band separator connected to said down converter and receptive to said converted MMDS signals for delivering said converted MMDS signals onto said communications line, said band separator further receiving said signals carrying data from said communications line in a second predetermined range of frequencies,
an up converter connected to said band separator and to said local oscillator for up converting said signals carrying data into said ITFS response data signals, and
a second feed mounted in the focal area of said reflector receptive to said ITFS response data signals from said up converter for transmitting said ITFS response data signals, said first and second feeds mounted orthogonal to each other and electrically isolated from each other to minimize interference so as to receive and transmit in different polarities.

11. The bi-directional MMDS/ITFS response converter and feed system of claim 10 wherein said down converter further comprises a printed circuit board having a first side, said first side having mounted thereon at least:
a first balun connected between said first feed and said down converter,
a bandpass filter receptive to said MMDS programming signals for filtering said MMDS programming signals, and
a mixer receptive to said filtered MMDS programming signals and connected to said local oscillator for producing said converted MMDS signals.

12. The bi-directional MMDS/ITFS response converter and feed system of claim 11 wherein said up converter is mounted on a side opposing said first side of said printed circuit board, said up converter at least comprising:
a mixer receptive to said signals carrying data and connected to said local oscillator for producing said ITFS response data signals,
a bandpass filter receptive to said produced ITFS response data signals, and
a second balun connected between said second feed and said up converter.

13. The bi-directional MMDS/ITFS converter and feed system of claim 10 further comprising:
a first printed circuit board, and wherein said first and second feeds are printed on the same side of said first printed circuit board.

14. The bi-directional MMDS/ITFS converter and feed system of claim 13 further comprising:
a second printed circuit board,
said down converter and said up converter mounted on said second printed circuit board,
said second printed circuit board connected perpendicularly to the center of said first printed circuit board.

15. The bi-directional MMDS/ITFS converter and feed system of claim 14 wherein said down converter is mounted on one side of said second printed circuit board and said up converter is mounted on a side opposing said one side so as to minimize interference between said MMDS programming signals and said ITFS response data signals.

16. A bi-directional MMDS/ITFS response converter and feed system connected to a reflector having a support boom for receiving MMDS programming signals and connected to a communications line for receiving signals carrying data, said bi-directional MMDS/ITFS response converter and feed system comprising:
a first printed circuit board, said first printed circuit board held in the focal area of said reflector by said support boom;
a first feed mounted on one side of said first printed circuit board for receiving said MMDS programming signals;
a local oscillator;
a second printed circuit board;
a down converter mounted on one side of said second printed circuit board connected to said first feed for down converting said received MMDS programming signals into converted programming signals, said down converter at least comprising:
  (a) a bandpass filter receptive to said received MMDS programming signals for filtering the received MMDS programming signals, and
  (b) a mixer receptive to the filtered MMDS programming signals and connected to said local oscillator for producing said converted programming signals;
means connected to said down converter and receptive to said converted programming signals for delivering said converted programming signals onto said communications line in a first predetermined range of frequencies, said delivering means further receiving said signals carrying data from said communications line in a second predetermined range of frequencies;
an up converter mounted on a side opposing said one side of said second printed circuit board and connected to said delivering means for up converting said signals carrying data into ITFS response signals, said up converter at least comprising:
  (a) a mixer receptive to said signals carrying data and connected to said local oscillator for producing said ITFS response signals, and
  (b) a bandpass filter receptive to said ITFS response signals for filtering the ITFS response signals; and
a second feed mounted on said one side of said first printed circuit board and receptive to said filtered ITFS response signals from said up converter for transmitting said filtered ITFS response signals, said first and second feeds arranged on said first printed circuit board to be electrically isolated.

17. The bi-directional MMDS/ITFS response converter and feed system of claim 16 wherein said second printed circuit board with said up and down converters mounted thereto are contained within said support boom.

18. The bi-directional MMDS/ITFS response converter and feed system of claim 17 wherein one end of said second printed circuit board connects perpendicularly to said first printed circuit board.

19. The bi-directional MMDS/ITFS response converter and feed system of claim 18 wherein a first balun on said one side of said second printed circuit board electrically connects said first feed to said down converter and wherein a second balun on said side opposing said one side of said second printed circuit board electrically connects said second feed to said up converter.

20. The bi-directional MMDS/ITFS response converter and feed system of claim 16 wherein said first and second feeds each comprise a pair of dipole elements and wherein said first feed is orthogonal to said second feed.

21. An integrated bi-directional MMDS/ITFS response converter and feed system connected to a reflector having a support boom for receiving MMDS programming signals and connected to a communications line for receiving signals carrying data, said bi-directional MMDS/ITFS response converter and feed system comprising:
a first printed circuit board, said first printed circuit board held in the focal area of said reflector by said support boom;
a first feed mounted on one side of said first printed circuit board for receiving said MMDS programming signals;
a local oscillator;
a second printed circuit board;
a down converter mounted on one side of said second printed circuit board connected to said first feed for down converting said received MMDS programming signals into converted programming signals, said down converter at least comprising:
  (a) a first balun connected between said first feed and said down converter,
  (b) a bandpass filter receptive to said received MMDS programming signals for filtering the received MMDS programming signals, and
  (c) a mixer receptive to the filtered MMDS programming signals and connected to said local oscillator for producing said converted programming signals;
means connected to said down converter and receptive to said converted programming signals for delivering said converted programming signals onto said communications line in a first predetermined range of frequencies, said delivering means further receiving said signals carrying data from said communications line in a second predetermined range of frequencies;
a second feed;
an up converter mounted on a side opposing said one side of said second printed circuit board and connected to said delivering means for up converting said signals carrying data into ITFS response signals, said up converter at least comprising:
  (a) a second balun connected between said second feed and said up converter, (b) a mixer receptive to said signals carrying data and connected to said local oscillator for producing said ITFS response signals, and
(c) a bandpass filter receptive to said ITFS response signals for filtering the ITFS response signals; and said second printed circuit board with said up and down converters mounted thereto being contained within said support boom;

said second feed mounted on said one side of said first printed circuit board and receptive to said filtered ITFS response signals from said up converter for transmitting said filtered ITFS response signals, said first and second feeds arranged on said first printed circuit board to be electrically isolated, one end of said second printed circuit board connects perpendicularly to said first printed circuit board, and said first and second feeds each comprise a pair of dipole elements and wherein said first feed is orthogonal to said second feed.

* * * * *